United States Patent [19]

Motoori

[11] Patent Number: 5,038,364
[45] Date of Patent: Aug. 6, 1991

[54] TRANSMISSION LINE MONITORING SYSTEM

[75] Inventor: Hideyuki Motoori, Yokohama, Japan

[73] Assignee: Fujitsu Limited, Kawasaki, Japan

[21] Appl. No.: 441,646

[22] Filed: Nov. 27, 1989

[30] Foreign Application Priority Data

Nov. 28, 1988 [JP] Japan ............................ 63-299882

[51] Int. Cl.⁵ .......................................... H04B 17/02
[52] U.S. Cl. .................................... 375/3.1; 370/13.1
[58] Field of Search ...................... 375/3, 3.1, 10; 455/601, 16; 370/13.1, 97; 340/425; 379/22

[56] References Cited

U.S. PATENT DOCUMENTS

| | | | |
|---|---|---|---|
| 3,649,777 | 3/1972 | Matsushima | 375/3.1 |
| 3,760,127 | 9/1973 | Camiciottoli et al. | 375/3.1 |
| 3,868,484 | 2/1975 | Bolton et al. | 379/22 |
| 4,069,402 | 1/1978 | Mantovani et al. | 370/13.1 |
| 4,187,415 | 2/1980 | Bountmy et al. | 375/3.1 |
| 4,334,303 | 6/1982 | Bertin et al. | 370/13.1 |
| 4,896,317 | 1/1990 | Nakama et al. | 370/13.1 |

FOREIGN PATENT DOCUMENTS

54-47508  4/1979  Japan .
64-53657  3/1989  Japan .

Primary Examiner—Stephen Chin
Attorney, Agent, or Firm—Staas & Halsey

[57] ABSTRACT

A transmission line monitoring system for monitoring the quality of a transmission line along which a plurality of repeaters are equipped. A monitoring line is equipped along the transmission line for transmitting a signal for collecting information on the quality of the above transmission line. A plurality of monitoring units are respectively provided corresponding to the above plurality of repeaters. A centralized monitoring unit sends an instruction which includes information on a section of the transmission line which is to be tested, through the monitoring line, and receives the above information on the quality of the above section of the transmission line, which is sent from a monitoring unit responding to the above instruction through the above monitoring line. Each of the monitoring units receives the above instruction through the communicating circuit, and determines whether or not its own monitoring unit corresponds to a repeater at the beginning or the end of the section, by the control circuit. A test signal is sent through the section, when its own unit is determined as the above beginning, and a test signal is received and detected through the above section when its own unit is determined as the above end. The result of the detection of the test signal through the section is sent through the monitoring line to the centralized monitoring unit as the information on the quality of the section.

28 Claims, 5 Drawing Sheets

TRANSMISSION LINE MONITORING SYSTEM

BACKGROUND OF THE INVENTION (1) Field of the Invention

The present invention relates to a transmission line monitoring system for monitoring the quality of a transmission line along which a plurality of repeaters are equipped.

In communication network systems wherein communication terminals and offices are connected by transmission lines, generally a plurality of repeaters are equipped along the transmission lines for retiming, reshaping, and amplifying signals transmitted through the transmission lines.

In the above communication network systems, sometimes trouble occurs in a transmission line due to: a degradation of an AGC (automatic gain control) circuit in a repeater; a damage by a serge current caused by a thunderbolt; a degradation of a cable due to aging; a break in a cable; a malfunction of a power feeding circuit, and the like.

The repeaters are located, for example, in manholes or on telephone poles, and are generally unmanned. Therefore, the transmission lines are usually monitored at a terminal station regarding an occurrence of trouble, and when trouble occurs in a transmission line between communication offices, it is necessary first to determine where the trouble has occurred.

(2) Description of the Related Art

In the prior art, the following systems are proposed to monitor a transmission line and to determine the location of trouble in a pair of transmission lines (a two-way transmission line).

The Japanese Unexamined Patent Publication No. 54-47508 discloses loop back systems providing relay switches in repeaters and providing band pass filters in repeaters.

In the loop back system using relay switches, first and second relay switches and a control circuit are provided in each repeater which is located along a pair of transmission lines (a two-way transmission line). The first and second relay switches are each located at the front and rear sides of each repeater, respectively.

When a direct current signal is first sent from a monitoring station through the transmission line to a nearest repeater, a first relay switch in the nearest repeater connects the transmission lines in a sending direction and in a receiving direction in the repeater, so that a loop back circuit is made at the front side of the repeater, for carrying out a loop back test not including the repeater circuit.

When the next direct current signal is sent from the monitoring station through the transmission line to the above nearest repeater after the above loop back test is carried out, a second relay switch in the repeater connects transmission lines in a sending direction and in a receiving direction in the repeater, so that a loop back circuit is made at the rear side of the repeater, for carrying out a loop back test including the repeater.

When the third direct current signal is sent from the monitoring station through the transmission line to the above nearest repeater after the above loop back tests are carried out, the control circuit sends the signal to the next repeater, and then, similar operations for the loop back tests are performed in the next repeater.

In the loop back system using band pass filters, a plurality of band pass filters each having a different center frequency are provided at the front and rear sides of all the repeaters located along a pair of transmission lines (a two-way transmission line). Each band pass filter is connected between transmission lines in a sending direction and in a receiving direction at its position.

The loop back test is carried out by sending signal having a frequency which is equal to the center frequency of a band pass filter located in an objective position.

However, in both the above loop back systems using relay switches and using band pass filters, if troubles occur in a plurality of locations in a transmission line, the locations of the trouble except the location nearest to the monitoring station, cannot be determined.

The Japanese Unexamined Patent Publication No. 64-53657 discloses a system for monitoring an error rate in an output of a repeater for one of a plurality of transmission lines. The plurality of transmission lines are equipped in parallel between communication terminals, and a repeating operation for each transmission line is carried out in an amplifier. The amplifiers are provided for respective transmission lines, and contained in a repeater unit.

In the above system, a monitoring unit is provided for each repeater, a monitoring line is equipped along the transmission lines, and communication for collecting information on the error rate in each repeater is carried out between each monitoring unit and a monitoring station through the monitoring line using FSK (frequency shift keying) signals.

In addition, pulse transformers are provided at both sides of each amplifier, and the pulse transformers at the output side of the amplifiers each have an additional winding to monitor an output of a corresponding amplifier during a normal operation.

One of the monitored outputs is selected by a switch, the (bipolar) output of the switch is transformed to a unipolar signal, and the unipolar signal is input into an error monitor circuit. The output of the error monitor circuit is encoded in a CPU to a three-bit coded signal which indicates an error rate. The above switch, the error monitor circuit, and the CPU are contained in the monitoring unit.

The monitoring station sends address information including an address of an objective repeater, and an identification number of an objective transmission line, through the monitoring line to the objective repeater. When the CPU detects an address of a corresponding repeater, the CPU sends the above code indicating the error rate together with its own address through the monitoring line to the monitoring station. The monitoring station collects the error rate information of all the repeaters by an polling operation.

However, the object of the above system for monitoring an error rate in an output of a repeater is mainly to obtain information on the degradation of each repeater, and only error rate information in each repeater can be obtained. Therefore, it is not clear where the cause of the error in the output of a repeater exists, for example, when a break in a transmission line occurs, no information is obtained from the repeaters beyond the break point because no signal is transmitted beyond the break point, and therefore the monitoring of error rates is meaningless.

Figure 1:
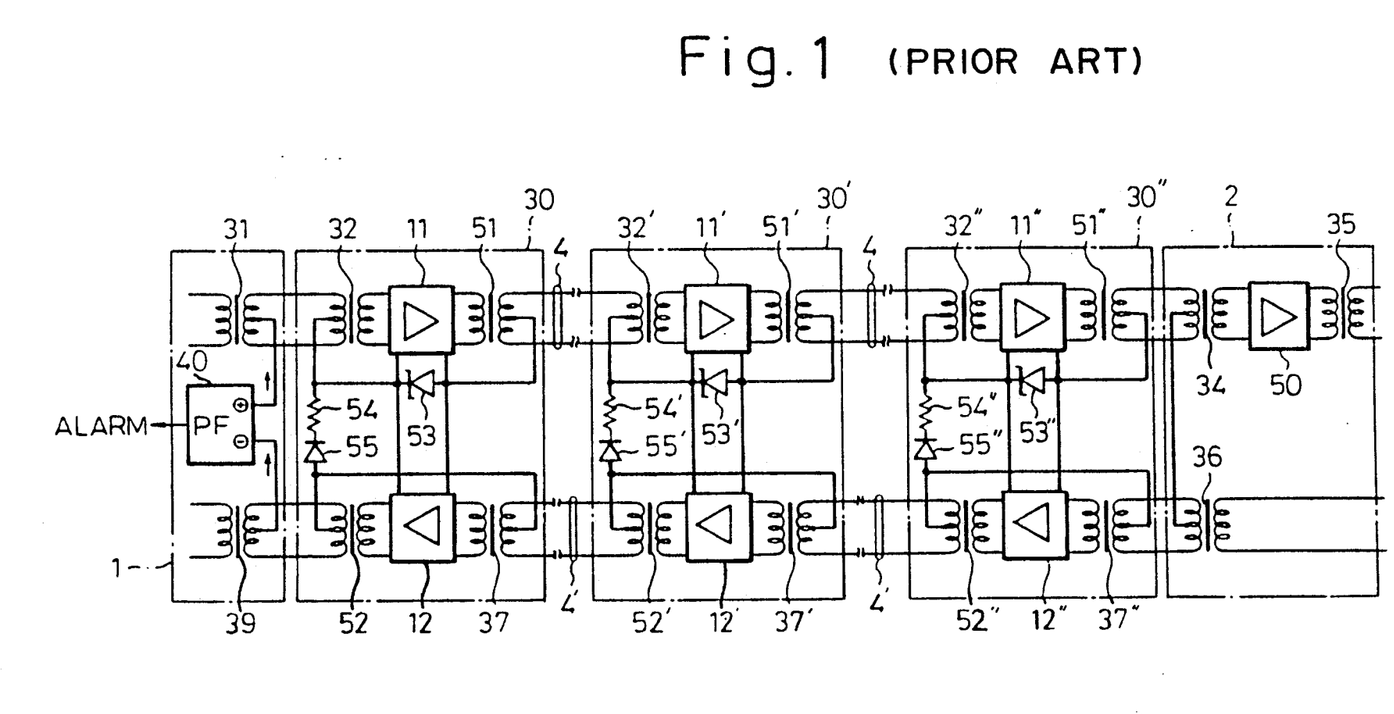
FIG. 1 shows an outline of the construction of an example of a conventional communication system having a plurality of repeaters along a transmission line connecting terminal repeater units.

FIG. 1 shows an outline of the construction of an example of a conventional two-way communication system having a plurality of repeaters along a two-way transmission line connecting terminal repeater units.

In FIG. 1, reference numerals 1 and 2 each denote a terminal repeater unit, 30, 30', and 30" each denote a repeater, 11, 11', 11", 12, 12', 12", and 50 each denote a regenerative repeating unit, 31, 32, 32', 32", 51, 51', 51", 34, 35, 36, 37, 37', 37", 52, 52', 52", and 39 each denote a pulse transformer, 53, 53', and 53" each denote a Zener diode, 54, 54', and 54" each denote a resistor, 55, 55', and 55" each denote a diode, and 40 denotes a power feeder circuit.

In the communication system shown in FIG. 1, data signals are transmitted between the terminal repeater units 1 and 2 through the transmission lines 4 and 4', and a plurality of repeaters 30, 30', and 30" are provided along the transmission line 4. The pulse transformers are provided at input and output sides of each of the terminal repeater units 1 and 2, and the repeaters 30, 30', and 30".

The power feeder circuit 40 is provided in one of the terminal repeater units 1, and an electric power is supplied in the form of a constant electric current from the power feeder circuit 40 to each repeater through the transmission lines 4 and 4' by connecting the output terminal of the power feeder circuit 40 to both of the secondary winding of the pulse transformer 31 and the primary winding of the pulse transformer 39, at the output side of the terminal repeater unit 1. The power is supplied to two regenerative repeating units for two-way transmission in each repeater as a terminal voltage of a corresponding Zener diode 53, 53', or 53", where the one terminal of each Zener diode is connected to the primary winding of the pulse transformer 32, 32', or 32", and the other terminal of each Zener diode is connected to the secondary winding of a corresponding pulse transformer 51, 51', or 51". The circuit for feeding the power to the repeaters 30, 30', and 30" is completed by further connecting a primary winding of the pulse transformer 34 to a primary winding of the pulse transformer 36, and connecting a primary winding of a pulse transformer 37, 37', or 37" in the input side to a secondary winding of a corresponding pulse transformer 52, 52', or 52" in the output side of each repeater 30, 30', or 30".

The terminal repeater unit 1 (the power feeder circuit 40 in the terminal repeater unit) functions to output an alarm signal when a direct current does not flow from the power feeding circuit through the transmission lines 4 and 4'.

The resistor 54, 54', or 54" and a corresponding diode 55, 55', or 55" are connected in series between the primary winding of a pulse transformer 32, 32', or 32" and the secondary winding of a pulse transformer 52, 52', or 52" in each repeater. The diode 55, 55', or 55" in each repeater is connected in the direction opposite to the voltage supplied by the power feeder circuit 40.

The resistors 54, 54', and 54" and the diodes 55, 55', and 55" in the repeaters 30, 30', and 30" are connected as above for another conventional method for monitoring the transmission line as explained below with reference to FIG. 2.

Figure 2:
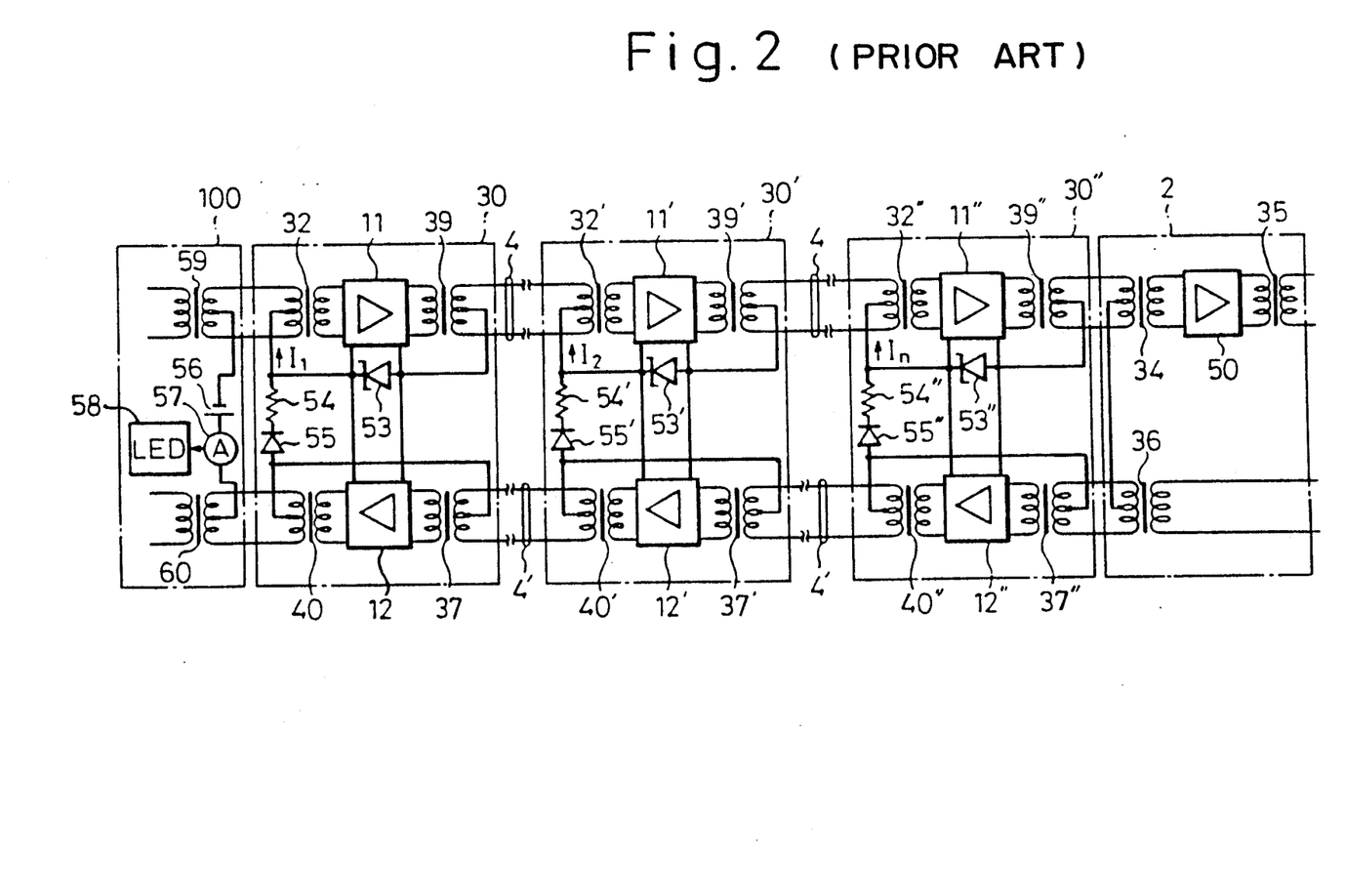
FIG. 2 shows a conventional transmission line monitoring system for monitoring the transmission lines 4 and 4' in the communication system of FIG. 1.

FIG. 2 shows a conventional transmission line monitoring system for monitoring the transmission lines 4 and 4' in the communication system of FIG. 1.

In FIG. 2, the terminal repeater unit 1 in the construction of FIG. 1 is replaced with a testing unit 100 for determining a position of a break in the transmission lines 4 and 4'.

In the testing unit 100, reference numeral 56 denotes a voltage source, 57 denotes an ampere meter, 58 denotes a display device using a light emitting device (LED), and 59 and 60 each denote a pulse transformers.

The pulse transformers 59 and 60 are provided at the output side of the testing unit 100, a secondary winding of the pulse transformer 59 is connected to the transmission line 4, and a primary winding of the pulse transformer 60 is connected to the transmission line 4'.

The voltage source 56 generates a constant voltage. One terminal of the voltage source 56 is connected to the secondary winding of the pulse transformer 59, and the other terminal of the voltage source 56 is connected to one terminal of the ampere meter 57. The other terminal of the ampere meter 57 is connected to the primary winding of the pulse transformer 60. The direction of the connection of the voltage source 56 is opposite to the power feeder circuit 40, and therefore, the current from the voltage source 56 can pass through the series connections of the resistors 54, 54', and 54" and the corresponding diodes 55, 55', and 55" in the repeaters 30, 30', and 30", in parallel with the aforementioned current path through the transmission lines 4 and 4' and the Zener diodes 53, 53', and 53".

When no break occurs in the transmission lines 4 and 4', all the paths by the above series connections of the resistors 54, 54', and 54" and the corresponding diodes 55, 55', and 55" contribute to the total current value detected in the ampere meter 57, and when a break occurs in a position of the transmission lines 4 and 4', only the series connections of the resistors and the diodes located in the side of the terminal repeater unit 1 from the position of the break, can contribute to the total current. Therefore, the position of the break is determined by the total current value which is detected in the ampere meter 57, and is displayed on the display device 58.

In practice, when the communication system is installed, repeaters are connected one by one in the direction from the terminal repeater unit 1 to the other terminal repeater unit 2, and at the same time the current values are measured in respective conditions of the numbers of the connected repeaters.

In a monitoring operation, the testing unit 100 is connected in the place of the terminal repeater unit 1 as shown in FIG. 2, and the current value is detected by the ampere meter 57 and the display device 58. The detected value is compared with the above values measured in advance, and thus the section of the transmission lines 4 and 4' wherein a break occurs, is determined.

However, in the above monitoring system shown in FIGS. 1 and 2, similar to the aforementioned loop back systems using relay switches and using band pass filters, if troubles occur in a plurality of locations in a transmission line, the locations of the trouble except the location nearest to the monitoring station, and which one of a pair of transmission lines constituting a two-way transmission line has trouble, cannot be determined.

SUMMARY OF THE INVENTION

An object of the present invention is to provide a transmission line monitoring system whereby it becomes possible to monitor the quality of any section of a transmission line.

According to the present invention, there is provided a transmission line monitoring system for monitoring the quality of a transmission line along which a plurality of repeaters are equipped, which monitoring system includes: a monitoring line, equipped along the transmission line, for transmitting a signal for collecting information on the quality of the above transmission line; a centralized monitoring unit for collecting information on the quality of the above transmission line through the above monitoring line; and a plurality of monitoring units, respectively provided corresponding to the above plurality of repeaters. Each of the above monitoring units comprises, a communicating circuit, a test signal sending circuit, a test signal receiving circuit, and a control circuit. The communicating circuit is provided for communicating with the above centralized monitoring unit. The test signal sending circuit sends a test signal through a section of the transmission line which is to be tested, when its own monitoring unit corresponds to a repeater which is instructed by the above centralized monitoring unit as a beginning of the above section. The test signal receiving circuit receives and detects a test signal through the above section when its own monitoring unit corresponds to a repeater which is instructed by the above centralized monitoring unit as an end of the above section. The control circuit detects an instruction which is sent from the above centralized monitoring unit through the above monitoring line and the above communicating circuit, and which instruction includes information on a section of the above transmission line which is to be tested. The control circuit controls the above operation of sending the above test signal and an operation of sending information on the quality of the above section through the above communicating circuit and the above monitoring line to the above centralized monitoring unit.

DESCRIPTION OF THE PREFERRED EMBODIMENTS

Figure 3:
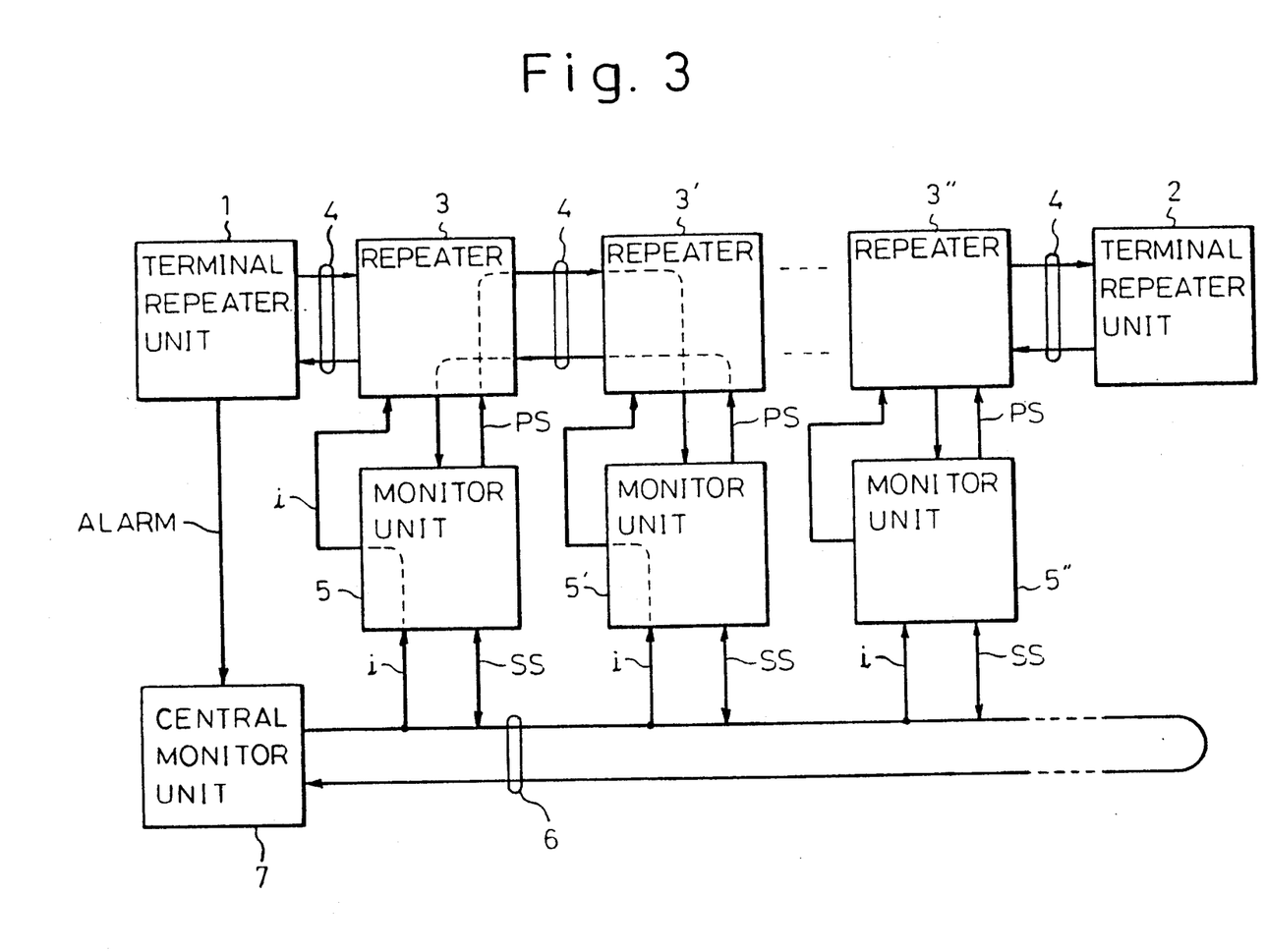
FIG. 3 shows an outline of the construction of an embodiment of the present invention.

FIG. 3 shows an outline of the construction of an embodiment of the present invention.

In FIG. 3, reference numerals 1 and 2 each denote a terminal repeater unit, 3, 3', and 3" each denote a repeater, 5, 5', and 5" each denote a monitoring unit, 6 denotes a monitoring line, and 7 denotes a centralized monitoring unit.

The terminal repeater units 1 and 2 are the same as the corresponding terminal repeater units 1 and 2 in the construction of FIG. 1.

The monitoring units 5, 5', and 5" are each provided for respective repeaters 3, 3', and 3", and the monitoring line 6 is provided along the transmission lines 4 and 4' for communication between the centralized monitoring unit 7 and each of the monitoring units 5, 5', and 5".

The centralized monitoring unit 7 sends an instruction which includes information on a section of the transmission line 4 or 4' which is to be tested, through the monitoring line 6. The instruction can select one of the transmission lines 4 and 4'.

Each of the monitoring units 5, 5', and 5" receives the above instruction through the monitoring line 6, and determines whether or not its own monitoring unit corresponds to a repeater at the beginning or the end of the section.

A test signal is sent from the monitoring unit corresponding to a repeater which is instructed as the beginning of the section through the section, and the test signal is transmitted through the above section, and received and detected in the monitoring unit corresponding to a repeater which is instructed as the end of the section.

When the test signal is correctly received and detected in the monitoring unit corresponding to a repeater which is instructed as the end of the section, it is determined that the section of the transmission line is normal (not damaged). As a test signal, for example, a predetermined bit pattern is used, i.e., a predetermined bit pattern is generated and sent from the monitoring unit corresponding to a repeater which is instructed as the beginning of the section, through the section to the monitoring unit corresponding to a repeater which is instructed as the end of the section. The pattern is detected in the monitoring unit corresponding to a repeater which is instructed as the end of the section.

When the bit pattern is correctly received and detected in the monitoring unit corresponding to a repeater which is instructed as the end of the section, it is determined that the section of the transmission line is normal (not damaged).

The result of the detection of the test signal through the section is sent through the monitoring line 6 to the centralized monitoring unit 7 as the information on the quality of the section.

The centralized monitoring unit 7 receives the above information on the quality of the above section of the transmission line, which is sent from the above monitoring unit corresponding to the end of the section responding to the above instruction through the monitoring line 6.

In particular, when each adjacent pair of repeaters are respectively instructed as the above beginning and end of a section, it is determined whether or not trouble has occurred in a section between each adjacent pair of repeaters.

Further, normally, an electric power is fed to the above plurality of repeaters through the transmission lines 4 and 4' similar to the construction of FIG. 1. However, when the transmission lines 4 and 4' are damaged, the electric power cannot be fed to the repeaters, at least to the repeaters beyond the damaged point.

Therefore, in the present invention, the centralized monitoring unit 7 has another power feeding circuit which is able to feed electric power (denoted by "i" in FIG. 3) to a repeater through the monitoring line 6 and a corresponding monitoring unit, and each monitoring unit further has a power feed selector which can introduce the electric power supplied from the power feeder circuit to a corresponding repeater by selecting control, as explained later.

Figure 4:
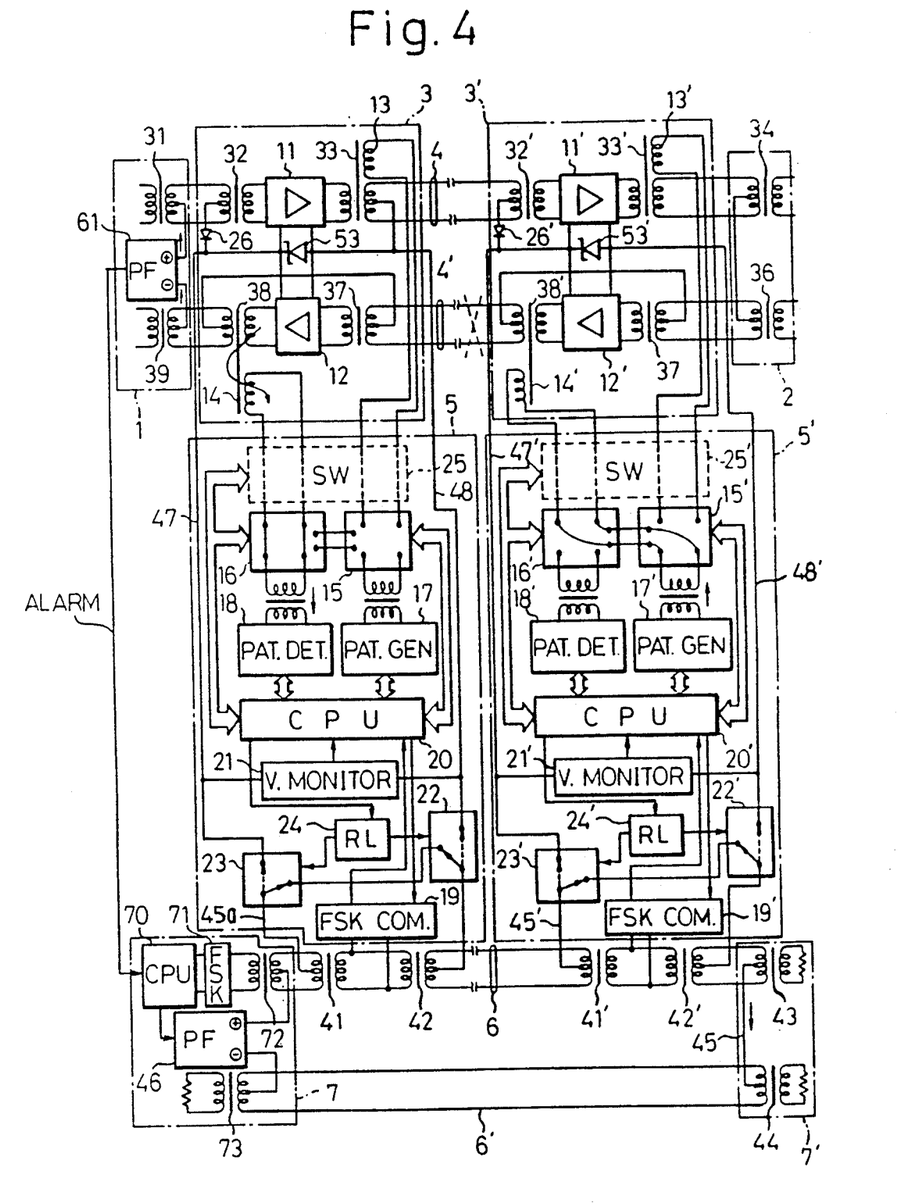
FIGS. 4 and 5 show a detailed construction of the embodiment of the present invention in two test modes.
Figure 5:
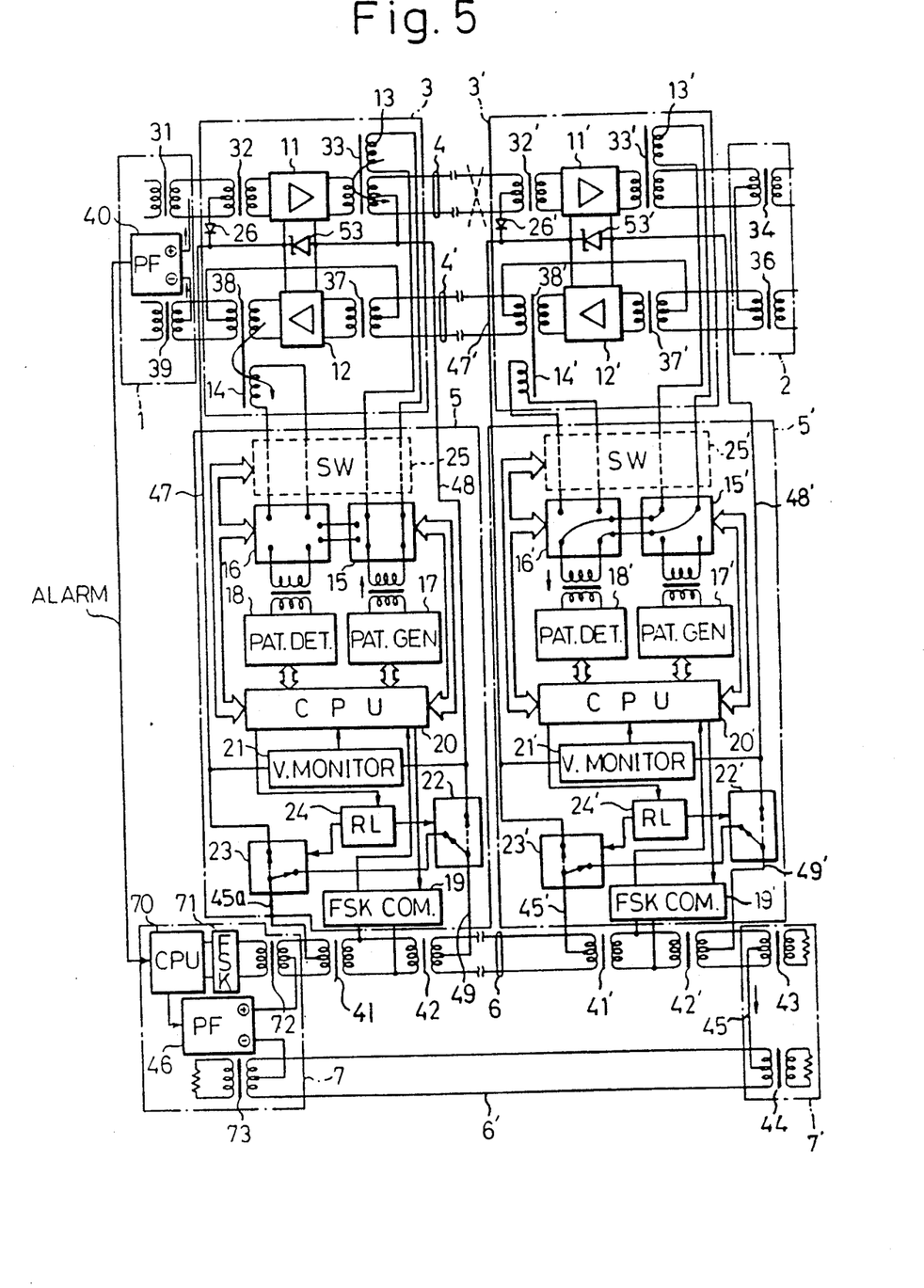

FIGS. 4 and 5 show a detailed construction of the embodiment of the present invention in two test modes, respectively. Although not shown in FIGS. 4 and 5, detailed constructions of repeaters and monitoring units other than the repeaters 3 and 3' and the corresponding monitoring units 5 and 5', are the same as the repeaters 3 and 3' and the monitoring units 5 and 5'.

FIG. 4 shows the construction in a test mode for determining whether or not the section of the transmission line 4' between the repeaters 3 and 3' is damaged, and FIG. 5 shows the construction in a test mode for determining whether or not the section of the transmission line 4 between the repeaters 3 and 3' is damaged.

In FIGS. 4 and 5, the same reference numerals as FIG. 1, each denote the same components, respectively.

The repeaters 3, 3' in FIG. 4, (and 3" in FIG. 3), each correspond to the repeaters 30, 30', (and 30") in FIG. 1, except for the following differences.

The first difference is that a pulse transformer 33, 33', 38, or 38' provided in the output side of each regenerative repeating unit 11, 11' 12, or 12' has an additional winding 13, 13', 14, or 14' to input a test signal into a section of a transmission line, and to output an output signal of each regenerative repeating unit 11, 11' 12, or 12'.

The second difference is that both the terminals of the Zener diode 53 or 53' in each repeater is further connected to corresponding terminals of a corresponding monitoring unit so that an electric power can be supplied from a corresponding monitoring unit, and the terminal voltage of the Zener diode can be monitored in a voltage monitor circuit 21 or 21' in a corresponding monitoring unit.

The third difference is that the aforementioned series connection of the resistor 54 and the diode 55 (the resistor 54' and the diode 55', or the resistor 54" and the diode 55") in each repeater, which is used for the conventional monitoring system, is removed in the construction of the present invention shown in FIGS. 4 and 5.

The fourth difference is that a diode 26 or 26' is connected between the primary winding of a pulse transformer 32 or 32' and the terminal of a corresponding Zener diode 53 or 53' so that a current supplied from a corresponding monitoring unit will not flow into the winding.

In addition, in practice, a plurality of two-way transmission lines are contained in a cable together with a monitoring line, although two-way transmission lines other than a pair of transmission lines 4 and 4' which constitutes a two-way transmission line, are not shown in FIGS. 4 and 5. The constructions of these two-way transmission lines and accompanying plurality of repeaters, are the same as the transmission lines 4 and 4' and the repeaters 3 and 3'.

The monitoring units 5 and 5' respectively contain selector switches 25 and 25', pairs of matrix switches 15 and 16, and 15' and 16', pattern generators 17 and 17', pattern detectors 18 and 18', central processing units (CPU's) 20 and 20', voltage monitor circuits 21 and 21', relays 24 and 24', pairs of relay switches 22 and 23, 22' and 23', and FSK communication circuits 19 and 19'.

The construction and operation of the monitoring unit 5' are explained below. The constructions and operations of the other monitoring units 5 and 5" are substantially the same as the constructions and operations of the monitoring unit 5.

The selector switch 25' is comprised of two selector portions, where one selector portion connects two terminals of an additional winding 13' among one of the plurality of two-way transmission lines, with a first pair of terminals of the matrix switch 15', and the other selector portion connects two terminals of an additional winding 14' among one of the plurality of two-way transmission lines, with a first pair of terminals of the matrix switch 16'. The connections in the above two selector portions are controlled by the CPU 20' according to an instruction received from the centralized monitoring unit 7. A second pair of terminals in each of the selector portions are connected to each other.

A third pair of terminals of the matrix switch 15' and the matrix switch 16' are respectively connected to the pattern generator 17' and the pattern detector 18' through respective pulse transformers.

The pattern generator 17' generates a predetermined bit pattern in the form of bipolar signals. When a monitoring unit 5' to which its own pattern generator belongs, corresponds to a repeater which is instructed by the centralized monitoring unit 7 as a beginning of a section, the generated pattern is output through a pulse transformer to the third pair of terminals of the matrix switch 15'.

The pattern detector 18' detects a predetermined bit pattern in a signal received from a corresponding repeater through the third pair of terminals of the matrix switch 16' and a pulse transformer, when a monitoring unit 5' to which its own pattern generator belongs, corresponds to a repeater which is instructed by the centralized monitoring unit 7 as an end of a section.

The third pair of terminals of the matrix switch 15' are connected to the first pair of its own matrix switch 15' (in a way similar to the connection shown in the matrix switch 15 in FIG. 5) when a monitoring unit 5' to which its own pattern generator belongs, corresponds to a repeater which is instructed by the centralized monitoring unit 7 as the beginning of the section between the repeater 3' and a next repeater in the right side (not shown) of the transmission line 4 so that the pattern signal generated in the pattern generator 17' can be supplied to the additional winding 13' through the selector switch 25'.

The third pair of terminals of the matrix switch 15' are connected to the first pair of the other matrix switch 16' (as shown in FIG. 4) through the second pair of terminals when a monitoring unit 5' to which its own pattern generator belongs, corresponds to a repeater which is instructed by the centralized monitoring unit 7 as the beginning of the section between the repeaters 3' and 3 of the transmission line 4', so that the pattern signal generated in the pattern generator 17' can be supplied to the additional winding 14' through the selector switch 25'.

The third pair of terminals of the matrix switch 16' are connected to the first pair of the other matrix switch 15' (as shown in FIG. 5) through the second pair of terminals when a monitoring unit 5' to which its own pattern generator belongs, corresponds to a repeater which is instructed by the centralized monitoring unit 7 as the end of the section between the repeaters 3 and 3' of the transmission line 4, so that the pattern signal received in the additional winding 13' can be supplied to the pattern detector 18' through the selector switch 25'.

The third pair of terminals of the matrix switch 16' are connected to the first pair of its own matrix switch 16' (in a way similar to the connection shown in the matrix switch 16 in FIG. 4) when a monitoring unit 5' to which its own pattern generator belongs, corresponds to a repeater which is instructed by the centralized monitoring unit 7 as the end of the section between the repeaters 3' and a next repeater in the right side (not shown) of the transmission line 4', so that the pattern signal received in the additional winding 14' can be supplied to the pattern detector 18' through the selector switch 25'.

The CPU 20' controls the output operation of the pattern generator 17' when a monitoring unit 5' to which its own CPU 20' belongs, corresponds to a repeater which is instructed by the centralized monitoring unit 7 as a beginning of a section. Or the CPU 20' receives an output of the pattern detector 18', and sends the result of the detection to the centralized monitoring unit 7 through the FSK communication circuit 19' when a monitoring unit 5' to which its own CPU 20' belongs, corresponds to a repeater which is instructed by the centralized monitoring unit 7 as the end of the section.

The voltage monitor circuit 21' monitors the terminal voltages of the Zener diodes 53' in corresponding plurality of repeaters for the plurality of two-way transmission lines, through power feeding lines 47' and 48'. When the terminal voltage is detected as under a predetermined threshold level, a power alarm signal is sent to the CPU 20'.

When The CPU 20' receives a power alarm from the voltage monitor circuit 21', the CPU 20' controls the relay 24' to connect the above power feeding lines 47' and 48' with power feeding lines 45' and 49' at the relay switches 22' and 23'. Thus an electric power is drawn from the monitoring line 6 to the terminals of the Zener diode 53' through the relay switches 22' and 23' and the above power feeding lines 47' and 48'. This mechanism realizes the power feeder selector mentioned before with reference to FIG. 3.

Therefore, when the electric power supplied from the terminal repeater unit 1 to regenerative repeating units 11' and 12' in a corresponding repeater has broken, this break is detected in the voltage monitor circuit 21', and the connections in the switches 22' and 23' are switched to feed the electric power from the centralized monitoring unit 7 to the regenerative repeating units 11' and 12', under the control of the CPU 20'. Alternatively, the above switching control may be instructed from the centralized monitoring unit 7 through the monitoring line 6.

The centralized monitoring unit 7 contains a CPU 70, an FSK communication circuit 71, pulse transformers 72 and 73, and a power feeder circuit 46.

When the aforementioned alarm signal from the terminal repeater unit 1, indicating a stop of a current flow for the power feed, is received in the centralized monitoring unit 7, the CPU 70 controls the power feeder circuit 46 to supply an electric power to the monitoring line 6, and then, the CPU 70 sends instructions to test of all sections between all adjacent pairs of repeaters of all of the plurality of transmission lines, and then receives the corresponding responses to the instructions from the monitoring units to determine the position(s) of the trouble.

The monitoring line 6 is connected through the pulse transformer 72 to the centralized monitoring unit 7, and is provided along the plurality of two-way transmission lines. Two pulse transformers, one 41' in the receiver side and the other 42' in the sending side of each monitoring unit, are provided in the monitoring line 6.

The terminals of secondary winding of the pulse transformer 41' are connected to the input/output terminals of the FSK communication circuit 19', and the FSK communication circuit 19' functions as an FSK modulator and demodulator.

The FSK communication circuit 19' receives instruction signals from the centralized monitoring unit 7 in an FSK form, demodulates the signals, receives a response from the CPU 20', modulates the response in the FSK form, and sends the modulated response to the centralized monitoring unit 7 through the pulse transformer 41'.

To make a circuit for feeding the electric power (direct current), a loop back unit 7' is provided beside the terminal repeater unit 2, and a return line 6' is provided along the monitoring line 6. The return line 6' terminates at the pulse transformer 73.

The loop back unit 7' contains the pulse transformers 43 and 44, and a line 45 connects the primary winding of the pulse transformer 43 and the secondary winding of the pulse transformer 44.

The terminals of the power feeder circuit 46 are connected to a secondary winding of the pulse transformer 72 and a primary winding the pulse transformer 73. The aforementioned power feeding line 45' in each monitoring unit is connected to the primary winding of the pulse transformer 41', and the power feeding line 49' in each monitoring unit is connected to the secondary winding of the pulse transformer 42'. The power feeding lines 45' and 49' are normally connected to each other through the relay switches 22' and 23' in each monitoring unit, i. e., the power feeding line is bypassed through each monitoring unit during normal operation.

In the above construction, the instruction from the centralized monitoring unit 7 contains: a number identifying the transmission line to be tested among the plurality of transmission lines; an address identifying the repeater corresponding to the beginning of a section to be tested; an address identifying a repeater corresponding to the end of the section to be tested; and optionally an instruction to switch the relay switches (22' and 23').

In each monitoring unit 5', the CPU 20' receives the above instruction through the FSK communication circuit 19', and determines whether or not its own address coincides with the above addresses of the beginning and end of the section. If it is determined that its own address does not coincide with the above addresses of the beginning and end of the section, no operation is carried out by the CPU 20'.

If it is determined that its own address coincides with the above addresses of the beginning of the section, the CPU 20' controls the matrix switches 15' and 16' according to a direction of signal transmission in the transmission line which is instructed to be tested, and information that a repeater corresponding to its own monitoring unit is instructed as the beginning of the section, controls the selector switch 25' according to the number identifying a transmission line to be tested, optionally switches the relay switches 22' and 23', and makes the pattern generator 17' output the pattern signal.

If it is determined that its own address coincides with the above addresses of the end of the section, the CPU 20' controls the matrix switches 15' and 16' according to a direction of signal transmission in the transmission line which is instructed to be tested, and information that a repeater corresponding to its own monitoring unit is instructed as the end of the section, controls the selector switch 25' according to the number identifying a transmission line to be tested, optionally switches the relay switches 22' and 23', and receives the output of the pattern detector 18', which indicates whether or not the pattern is detected through the section. Then the CPU 20' sends a response through the FSK communication circuit 19' to the centralized monitoring unit 7. The response contains the detection result in the pattern detector 18', and the address of the repeater corresponding to its own monitoring unit.

I claim:

1. A transmission line monitoring system for monitoring the quality of a transmission line along which a plurality of repeaters are equipped, comprising:

a monitoring line, equipped along said transmission line, for transmitting a signal for collecting information on the quality of said transmission line;

a centralized monitoring unit for collecting information on the quality of said transmission line through said monitoring line;

a plurality of monitoring units, respectively provided corresponding to said plurality of repeaters;

each of said monitoring units comprising, a communicating means for communicating with said centralized monitoring unit, a test signal sending means for sending a test signal through a section of said transmission line which is to be tested, when its own monitoring unit corresponds to a repeater which is instructed by said centralized monitoring unit as a beginning of said section, a test signal receiving means for receiving and detecting a test signal through said section when its own monitoring unit corresponds to a repeater which is instructed by said centralized monitoring unit as an end of said section, and a controlling means for detecting an instruction which is sent from said centralized monitoring unit through said monitoring line and said communicating means, and which includes information on a section of said transmission line which is to be tested, and for controlling said operation of sending said test signal and an operation of sending information on the quality of said section through said communicating means and said monitoring line to said centralized monitoring unit; and said centralized monitoring unit sends an instruction which includes information on a section of said transmission line which is to be tested, through said monitoring line, and receives said information on the quality of said section of said transmission line, which is sent from a monitoring unit responding to said instruction through said monitoring line.

2. A transmission line monitoring system, according to claim 1, wherein said test signal includes a predetermined bit pattern.

3. A transmission line monitoring system, according to claim 2, wherein said test signal sending means in each of said plurality of monitoring units comprises a test pattern generator which generates said predetermined bit pattern as said test signal.

4. A transmission line monitoring system, according to claim 2, wherein said test signal receiving means in each of said plurality of monitoring units comprises a test pattern detector which detects said predetermined bit pattern in a signal received through said section of said transmission line.

5. A transmission line monitoring system, according to claim 2, wherein said test signal is a bipolar signal.

6. A transmission line monitoring system, according to claim 1, wherein said instruction and said information which are transmitted through said monitoring line are modulated by a frequency shift keying modulation, and said communicating means in all the monitoring units and said centralized monitoring unit respectively comprise a modulator and a demodulator for carrying out a modulation and a demodulation by the frequency shift keying modulation.

7. A transmission line monitoring system, according to claim 1, wherein said section begins at an output side of a repeater corresponding to the beginning of said section, and ends at an output side of a repeater corresponding to the end of said section.

8. A transmission line monitoring system, according to claim 7, wherein an output side of each of said repeaters can be connected to a corresponding monitoring unit.

9. A transmission line monitoring system, according to claim 8, wherein each of said monitoring units further comprises a switch which connects said output side of a corresponding repeater with the test signal sending means in its own monitoring unit when its own monitoring unit corresponds to a repeater which is instructed as the beginning of said section; and which switch connects said output side with a test signal receiving means in its own monitoring unit when its own monitoring unit corresponds to a repeater which is instructed as the end of said section.

10. A transmission line monitoring system, according to claim 1, wherein each of said repeaters contains a regenerative repeating unit for carrying out a regenerative repeating operation of a signal transmitted through said transmission line, and said section begins at an output side of a regenerative repeating unit in a repeater corresponding to the beginning of said section, and ends at an output side of a regenerative repeating unit in a repeater corresponding to the end of said section.

11. A transmission line monitoring system, according to claim 1, wherein each of said repeaters contains a regenerative repeating unit for carrying out a regenerative repeating operation of a signal transmitted through said transmission line, pulse transformers provided at both the input and output sides of said regenerative repeating unit, where each of said pulse transformers has primary and secondary windings in its sending side and receiving side, respectively, and said pulse transformer which is provided at the output side of each regenerative repeating unit, has an additional winding other than said primary and secondary windings, where said additional winding can be connected to a corresponding monitoring unit.

12. A transmission line monitoring system, according to claim 11, wherein each of said monitoring units further comprises a switch which connects said additional winding at the output side of said regenerative repeating unit in a corresponding repeater with a test signal sending means when its own monitoring unit corresponds to a repeater which is instructed as the beginning of said section; and which switch connects said additional winding with a test signal receiving means when its own monitoring unit corresponds to a repeater which is instructed as the end of said section.

13. A transmission line monitoring system, according to claim 1, wherein a first electric power is normally fed to said plurality of repeaters through said transmission line, said centralized monitoring unit comprises a power feeding circuit which is able to feed a second electric power to a repeater through said monitoring line and a corresponding monitoring unit, and each monitoring unit further comprises a power feed selector means which can introduce said second electric power to a corresponding repeater in response to a select control.

14. A transmission line monitoring system, according to claim 13, wherein each monitoring unit further comprises a power monitoring circuit which monitors the condition of power fed to a corresponding repeater, and sends a signal for said select control to said power feed selector means when a malfunction in said power feed is detected.

15. A transmission line monitoring system for monitoring the quality of a plurality of transmission lines along which a plurality of repeaters are equipped, comprising:
- a monitoring line, equipped along said transmission lines, for transmitting a signal for collecting information on the quality of said transmission lines;
- a centralized monitoring unit for collecting information on the quality of said transmission lines through said monitoring line;
- a plurality of monitoring units, respectively provided corresponding to said plurality of repeaters;
- each of said monitoring units comprises,
  - a communicating means for communicating with said centralized monitoring unit,
  - a test signal sending means for sending a test signal through a section of one of said transmission lines which is to be tested, when its own monitoring unit corresponds to a repeater which is instructed by said centralized monitoring unit as a beginning of said section,
  - a test signal receiving means for receiving and detecting a test signal through said section when its own monitoring unit corresponds to a repeater which is instructed by said centralized monitoring unit as an end of said section,
  - a first switch for connecting said test signal sending means with a beginning point of said section;
  - a second switch for connecting said test signal receiving means with an end point of said section, and
  - a controlling means for detecting an instruction which is sent from said centralized monitoring unit through said monitoring line and said communicating means, and which includes information on a section of one of said transmission lines which is to be tested, and for controlling said connecting operations of said first and second switches and an operation of sending information on the quality of said section through said communicating means and said monitoring line to said centralized monitoring unit; and
- said centralized monitoring unit sends an instruction which includes information on a section of one of said transmission lines which is to be tested, through said monitoring lines, and receives said information on the quality of said section, which is sent from a monitoring unit responding to said instruction through said monitoring line.

16. A transmission line monitoring system, according to claim 15, wherein said test signal includes a predetermined bit pattern.

17. A transmission line monitoring system, according to claim 16, wherein said test signal sending means in each of said plurality of monitoring units comprises a test pattern generator which generates said predetermined bit pattern as said test signal.

18. A transmission line monitoring system, according to claim 16, wherein said test signal receiving means in each of said plurality of monitoring units comprises a test pattern detector which detects said predetermined bit pattern in a signal received through said section.

19. A transmission line monitoring system, according to claim 16, wherein said test signal is a bipolar signal.

20. A transmission line monitoring system, according to claim 15, wherein said instruction and said information which are transmitted through said monitoring line are modulated by a frequency shift keying modulation, and
- said communicating means in all the monitoring units and said centralized monitoring unit respectively comprise a modulator and a demodulator for carrying out a modulation and a demodulation by the frequency shift keying modulation.

21. A transmission line monitoring system, according to claim 15, wherein said section begins at an output side of a repeater corresponding to the beginning of said section, and ends at an output side of a repeater corresponding to the end of said section.

22. A transmission line monitoring system, according to claim 21, wherein an output side of each of said repeaters can be connected to a corresponding monitoring unit.

23. A transmission line monitoring system, according to claim 22, wherein said first switch connects said output side of a corresponding repeater with the test signal sending means in its own monitoring unit when its own monitoring unit corresponds to a repeater which is instructed as the beginning of said section; and said second switch connects said output side with a test signal receiving means in its own monitoring unit when its own monitoring unit corresponds to a repeater which is instructed as the end of said section.

24. A transmission line monitoring system, according to claim 15, wherein each of said repeaters contains a plurality of regenerative repeating units each for carrying out a regenerative repeating operation of a signal transmitted through a corresponding one of said transmission lines, and
- said section begins at an output side of a regenerative repeating unit in a repeater corresponding to the beginning of said section, and ends at an output side of a regenerative repeating unit in a repeater corresponding to the end of said section.

25. A transmission line monitoring system, according to claim 15, wherein each of said repeaters contains a plurality of regenerative repeating units each for carrying out a regenerative repeating operation of a signal transmitted through a corresponding one of said transmission lines, pulse transformers provided at both the input and output sides of each of said regenerative repeating units, where each of said pulse transformers has primary and secondary windings in its sender siding and receiver side, respectively, and
- said pulse transformer which is provided at the output side of said corresponding each of said regenerative repeating units, has an additional winding other than said primary and secondary windings, where said additional winding can be connected to a corresponding monitoring unit.

26. A transmission line monitoring system, according to claim 25, wherein said first switch connects said additional winding at the output side of a corresponding one of said regenerative repeating units in a corresponding repeater with the test signal sending means in its own monitoring unit when its own monitoring unit corresponds to a repeater which is instructed as the beginning of said section; and said second switch connects said additional winding at the output side of a corresponding one of said regenerative repeating units in a corresponding repeater with a test signal receiving means in its own monitoring unit when its own monitoring unit corresponds to a repeater which is instructed as the end of said section.

27. A transmission line monitoring system, according to claim 15, wherein a first electric power is normally fed to said plurality of repeaters through said transmission line, said centralized monitoring unit comprises a power feeding circuit which is able to feed a second electric power to a repeater through said monitoring line and a corresponding monitoring unit, and each monitoring unit further comprises a power feed selector means which can introduce said second electric power to a corresponding repeater in response to a select control.

28. A transmission line monitoring system, according to claim 27, wherein each monitoring unit further comprises a power monitoring circuit which monitors the condition of power fed to a corresponding repeater, and sends a signal for said select control to said power feed selector means when a malfunction in said power feed is detected.

* * * * *